United States Patent
Lim et al.

(10) Patent No.: US 11,457,349 B2
(45) Date of Patent: *Sep. 27, 2022

(54) METHOD AND APPARATUS FOR MANAGING USER EQUIPMENT HISTORY INFORMATION IN WIRELESS COMMUNICATION NETWORK

(71) Applicant: Samsung Electronics Co., Ltd., Gyeonggi-do (KR)

(72) Inventors: Chae Gwon Lim, Seoul (KR); Kyeong In Jeong, Gyeonggi-do (KR); Sung Ho Choi, Gyeonggi-do (KR); Beom Sik Bae, Gyeonggi-do (KR)

(73) Assignee: Samsung Electronics Co., Ltd

( * ) Notice: Subject to any disclaimer, the term of this patent is extended or adjusted under 35 U.S.C. 154(b) by 141 days.

This patent is subject to a terminal disclaimer.

(21) Appl. No.: 16/908,327

(22) Filed: Jun. 22, 2020

(65) Prior Publication Data

US 2020/0322784 A1 Oct. 8, 2020

Related U.S. Application Data

(63) Continuation of application No. 14/843,264, filed on Sep. 2, 2015, now Pat. No. 10,694,371, which is a (Continued)

(30) Foreign Application Priority Data

Apr. 28, 2009 (KR) ........................ 10-2009-0037205

(51) Int. Cl.
*H04Q 1/32* (2006.01)
*H04W 64/00* (2009.01)
(Continued)

(52) U.S. Cl.
CPC ......... *H04W 8/22* (2013.01); *H04W 36/0055* (2013.01); *H04W 36/165* (2013.01); (Continued)

(58) Field of Classification Search
CPC ............... H04W 8/22; H04W 36/0033; H04W 36/0055; H04W 36/165; H04W 4/18; (Continued)

(56) References Cited

U.S. PATENT DOCUMENTS

| 5,446,756 A | 8/1995 | Mallinckrodt |
| 5,966,656 A * | 10/1999 | Elkin ................ H04M 1/72516 455/421 |

(Continued)

FOREIGN PATENT DOCUMENTS

| EP | 3 383 090 | 10/2018 |
| JP | 2007-166644 | 6/2007 |

(Continued)

OTHER PUBLICATIONS

European Search Report dated Jul. 15, 2015 issued in counterpart Application No. 10769941.5-1857, pp. 7.

(Continued)

*Primary Examiner* — Edan Orgad
*Assistant Examiner* — Vanneilian Lalchinthang
(74) *Attorney, Agent, or Firm* — The Farrell Law Firm, P.C.

(57) ABSTRACT

A method and an apparatus are provided in a wireless communication system. The method includes generating mobility history information upon entering an evolved universal mobile telecommunications system (UMTS) radio access network (E-UTRAN) from another radio access technology (RAT), the mobility history information including information on a time duration for which the terminal stayed outside of the E-UTRAN; receiving, from a base (Continued)

station, a request for the mobility history information; and transmitting the mobility history information to the base station, in response to the request.

14 Claims, 7 Drawing Sheets

Related U.S. Application Data continuation of application No. 12/769,126, filed on Apr. 28, 2010, now Pat. No. 9,332,420.

(51) Int. Cl.

| | |
|---|---|
| *H04W 8/22* | (2009.01) |
| *H04W 36/00* | (2009.01) |
| *H04W 76/27* | (2018.01) |
| *H04W 36/16* | (2009.01) |
| *H04W 48/20* | (2009.01) |
| *H04W 88/02* | (2009.01) |
| *H04W 88/08* | (2009.01) |

(52) U.S. Cl.
CPC ............ *H04W 76/27* (2018.02); *H04W 48/20* (2013.01); *H04W 88/02* (2013.01); *H04W 88/08* (2013.01)

(58) Field of Classification Search
CPC ... H04W 76/27; H04W 8/24; H04W 36/0094; H04M 1/72516; H04M 1/724
USPC .......................................................... 370/329
See application file for complete search history.

(56) References Cited

U.S. PATENT DOCUMENTS

| | | | | |
|---|---|---|---|---|
| 6,091,716 | A | 7/2000 | Gorday | |
| 6,393,282 | B1 | 5/2002 | Iimori | |
| 7,079,842 | B2 | 7/2006 | Nagai | |
| 8,345,632 | B2* | 1/2013 | Mildh | ............... H04W 72/0406 370/331 |
| 2004/0082328 | A1 | 4/2004 | Japenga et al. | |
| 2007/0082688 | A1* | 4/2007 | Tu | ..................... H04W 52/0232 455/515 |
| 2007/0293201 | A1 | 12/2007 | Meda | |
| 2007/0293244 | A1* | 12/2007 | Lee | ........................ H04W 60/04 455/456.5 |
| 2008/0014957 | A1 | 1/2008 | Ore | |
| 2008/0096580 | A1 | 4/2008 | Montemurro | |
| 2008/0176551 | A1* | 7/2008 | Kawabata | ......... H04W 52/0229 455/421 |
| 2008/0268852 | A1 | 10/2008 | Petrovic et al. | |
| 2009/0232097 | A1* | 9/2009 | Taneja | ................... H04W 36/14 370/331 |
| 2010/0142486 | A1* | 6/2010 | Wahlqvist | ......... H04W 36/0083 370/332 |
| 2010/0191965 | A1 | 7/2010 | Fischer et al. | |
| 2010/0317349 | A1* | 12/2010 | Serravalle | ........... H04W 36/165 455/440 |
| 2010/0330993 | A1* | 12/2010 | Kone | ................ H04W 36/0079 455/436 |
| 2011/0026484 | A1* | 2/2011 | Fox | ........................ H04W 60/00 370/331 |
| 2011/0080825 | A1* | 4/2011 | Dimou | ................. H04J 11/0086 370/216 |
| 2011/0105153 | A1* | 5/2011 | Miklos | ................... H04W 60/04 455/456.5 |
| 2011/0130141 | A1 | 6/2011 | Frost et al. | |
| 2011/0183662 | A1 | 7/2011 | Lee et al. | |

FOREIGN PATENT DOCUMENTS

| | | |
|---|---|---|
| KR | 1020060067679 | 6/2006 |
| WO | WO 2008/040962 | 4/2008 |
| WO | WO 2008/049213 | 5/2008 |
| WO | WO 2008/133566 | 11/2008 |

OTHER PUBLICATIONS

Korean Office Action dated May 30, 2016 issued in counterpart Application No. 10-2010-0039273, 4 pages.
Korean Office Action dated Feb. 22, 2016 issued in counterpart Application No. 10-2010-0039273, 8 pages.
Nokia Siemens Networks, Nokia, "UE History Information for Inter-RAT", R2-083202, 3GPP TSG-RAN WG3 Meeting 62, Nov. 10-14, 2008, 10 pages.
European Search Report dated Nov. 19, 2019 issued in counterpart Appln. No. 19191509.9-1215, 8 pages.

* cited by examiner

FIG. 3

| INDEX | EVENT | CAMPING CELL ID | CELL IMFORMATION | REGISTERED PLMN | DURATION |
|---|---|---|---|---|---|
| 1 | ENTER IN IDLE MODE | CELL01 | PCI01, MACRO... | PLMN1 | 10 MINUTES AND 30 SECONDS |
| 2 | CELL RE-SELECTION | CELL02 | PCI02, MACRO... | PLMN1 | 5 MINUTES AND 3 SECONDS |
| 3 | SERVICE NON-AVAILABLE | - | - | - | 20 SECONDS |
| 4 | SELECT PLMN/CELL | CELL03 | PCI01, MACRO... | PLMN2 | 12 MINUTES AND 30 SECONDS |
| 5 | CELL RE-SELECTION | CELL04 | PCI11, MACRO... | PLMN2 | 30 MINUTES AND 23 SECONDS |

METHOD AND APPARATUS FOR MANAGING USER EQUIPMENT HISTORY INFORMATION IN WIRELESS COMMUNICATION NETWORK

PRIORITY

This application is a Continuation Application of U.S. application Ser. No. 14/843,264, which was filed in the U.S. Patent and Trademark Office (USPTO) on Sep. 2, 2015, which is a Continuation Application of U.S. application Ser. No. 12/769,126, which was filed in the USPTO on Apr. 28, 2010 and issued as U.S. Pat. No. 9,332,420 on May 3, 2016, and claims priority to Koran Application Serial No, 10-2009-0037205, which was filed with the Korean Intellectual Property Office on Apr. 28, 2009, the entire content of each of which is incorporated herein by reference.

BACKGROUND OF THE INVENTION

1. Field of the Invention

The present invention relates to a wireless communication network, and more particularly, to a method and an apparatus for managing User Equipment (UE) history information in order to improve performance of the wireless communication network.

2. Description of the Related Art

Generally, a Universal Mobile Telecommunications System (UMTS) is a third generation (3G) mobile communication system that uses Wideband Code Division Multiple Access (WCDMA) based on Global System for Mobile communications (GSM) and General Packet Radio Services (CPRS). A third Generation Partnership Project (3GPP) for standardization of the UMTS has suggested an Evolved Packet System (EPS) of the UMTS similar to the Long Term Evolution (LTE) system. In this case, the LTE system is a technology for implementing high-speed packet based communication.

In the EPS, while a source base station is downloading source data, a handover of a User Equipment (UE) can occur from the source base station to a target base station. At this time, the source base station forwards the source data to the target base station. Further, the target base station downloads the source data and next followed target data. In this case, the source base station records UE history information as a UE Context. Upon handover, the source base station transfers the UE history information to the target base station.

The UE history information may include cell ID, cell type (large, small, etc.), a time served from a cell, and information on a plurality of cells with information of a recent serving cell. The UE history information is used to prevent a ping-pong handover of a UE from a target cell (a continuous handover of the UE between two base stations within a short time) and for a radio resource allocation algorithm to the UE after estimation of a moving speed of the UE. However, the UE does not process the UE history information even though the serving base station creates it. When the UE firstly accesses the serving base station, because the UE history information is not created, the serving base station cannot use the UE history information.

SUMMARY OF THE INVENTION

The present invention has been made in view of the above problems, and provides a method for managing UE history information in a wireless communication network that collects and provides its history information by an UE operating in an idle mode to the wireless communication network, thereby providing an efficient data transmission environment to the UE and providing valid information on an operation of a wireless communication system to the wireless communication network.

In accordance with an aspect of the present invention, a method is provided by a terminal in a wireless communication system. The method includes generating mobility history information upon entering an evolved universal mobile telecommunications system (UMTS) radio access network (E-UTRAN) from another radio access technology (RAT), the mobility history information including information on a time duration for which the terminal stayed outside of the E-UTRAN; receiving, from a base station, a request for the mobility history information; and transmitting the mobility history information to the base station, in response to the request.

In a method for managing UE history information in a wireless communication network accordance with the present invention, a UE transmits its UE history information to a serving base station, so that the serving base station can provide an efficient data transmission environment to the UE based on the UE history information. Further, the UE transmits its UE history information to an O&M (Operating and Management) server or a core network entity of a wireless communication network, so that a network operator can use the UE history information for managing the wireless communication network.

BRIEF DESCRIPTION OF THE DRAWINGS

The objects, features and advantages of the present invention will be more apparent from the following detailed description in conjunction with the accompanying drawings, in which:

FIG. 3 is a diagram illustrating history information recorded by a UE operating in an idle mode according to an embodiment of the present invention;

DETAILED DESCRIPTION OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

First, a configuration of a wireless communication network is described. The wireless communication network according to an embodiment of the present invention is configured based on a cellular system.

Figure 1:
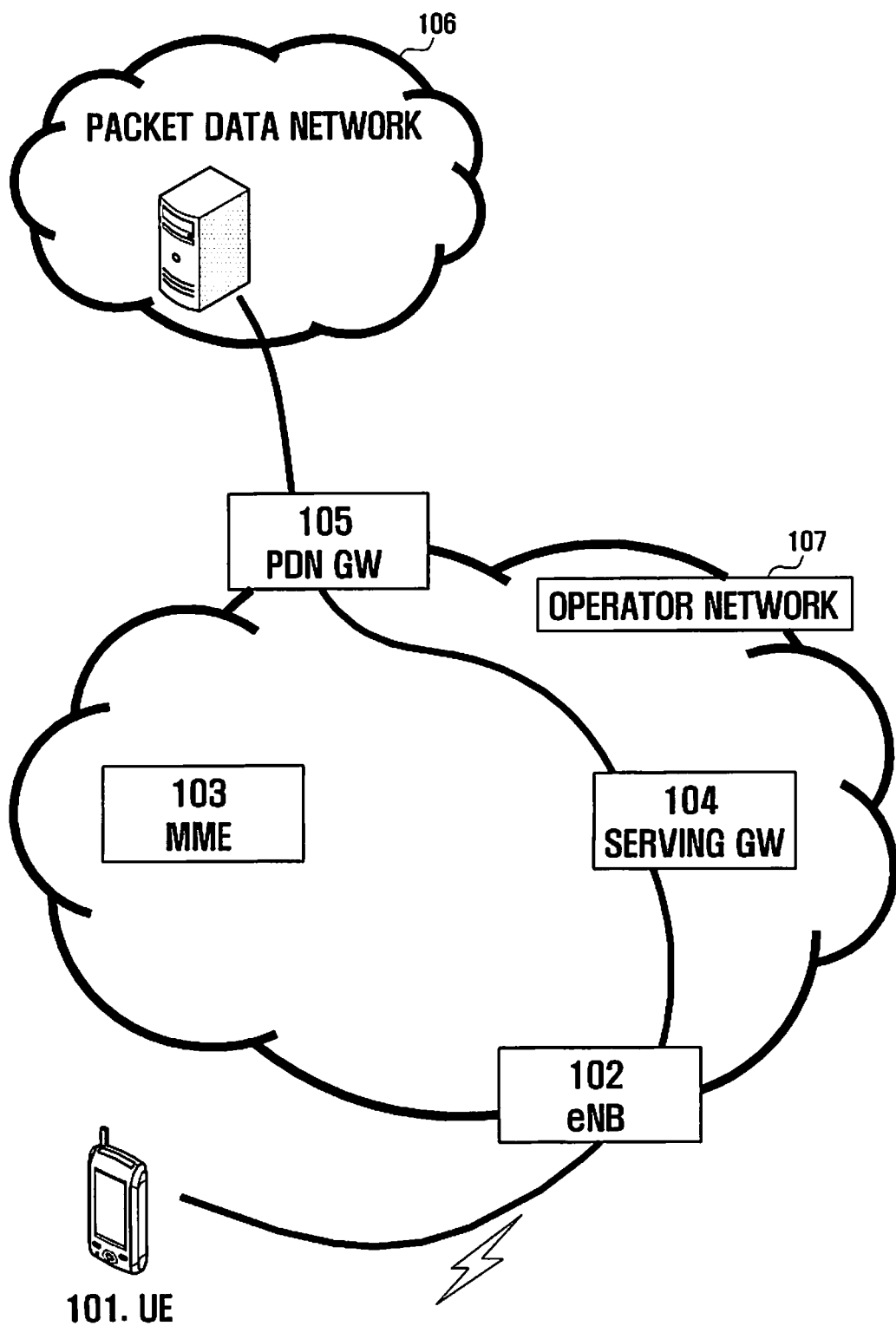
FIG. 1 is a diagram illustrating a configuration of a wireless communication network according to an embodiment of the present invention.

FIG. 1 is a diagram illustrating a configuration of a wireless communication network according to an embodiment of the present invention.

Referring to FIG. 1, the wireless communication network according to an embodiment of the present invention includes a User Equipment (UE) 101, an Evolved UMTS Radio Access Network (E-UTRAN) 102, a Mobility Management Entity (MME) 103, a Serving GateWay (SGW) 104, a Packet data network GateWay (PGW) 105, a Packet Data Network 106, and an Operator Network 107. The user equipment 101 may be fixed or mobile.

The E-UTRAN 102 accesses the UE 101 through a wireless channel. The E-UTRAN 102 is composed of a plurality of cells. The E-UTRAN 102 includes a plurality of evolved base stations, or Node Bs (eNBs) for controlling respective cells. The evolved base stations eNBs may be connected to each other through an X2 interface. The evolved base stations (eNBs) execute a radio bearer control function, a radio admission control function, a connection mobility control function, and a Radio Resource Management (RRM) function such as dynamic resource allocation to the UE 101. Further, the evolved base stations eNBs execute an Internet is Protocol (IP) header compression and data encryption function, a data routing function, a scheduling and transmitting function of a paging message, a scheduling and transmitting function of broadcast information, a measurement function for mobility and scheduling, and a measurement report set function. Namely, the evolved base stations eNBs receive downloading of data and transmits the downloaded data to the UE 101.

The E-UTRAN 102 includes a source base station and a target base station. The source base station indicates a base station currently being accessed by the UE 101. The target base station indicates a base station that the UE 101 wants to access through hand-over. Namely, upon a handover from the source base station to the target base station, the UE 101 terminates access to the source base station, and initiates access to the target base station. In other words, when the UE 101 accesses the source base station, the source base station downloads source data. Upon the hand-over from the source base station to the target base station, the source base station forwards source data to the target base station. Further, the target base station downloads target data followed by the source data. At this time, the source base station transmits UE history information recorded as a UE Context to the target base station at the time of the handover.

The MME 103 accesses the E-UTRAN 102 by a wired channel. In this case, the MME 103 is connected to the E-UTRAN 102 through an SI interface. The MME 103 executes a paging message distribution function to the evolved base station, a ciphering and integrity protection function of Non-Access Stratum (NAS) signaling, an idle state mobility control function, and a bearer control function.

The SGW 104 accesses the E-UTRAN 102 and the MME 103 by a wired channel. In this case, the SGW 104 is connected to the E-UTRAN 102 through an SI interface. The SGW 104 can be provided with plurality of SGWs. Namely, the SGW 104 accesses at least one evolved base station. Further, the SGW 104 executes a mobility control function of the UE 101 and the like.

The PGW 105 accesses the SGW 104 by a wired channel. The POW 105 further accesses an IP network. The PGW 105 executes an IP address allocation function and a data filtering function for the UE 101. That is, the POW 105 transmits data provided from an IP network 106 to the UE 101 through the SGW 104 and the E-UTRAN 102.

Figure 2:
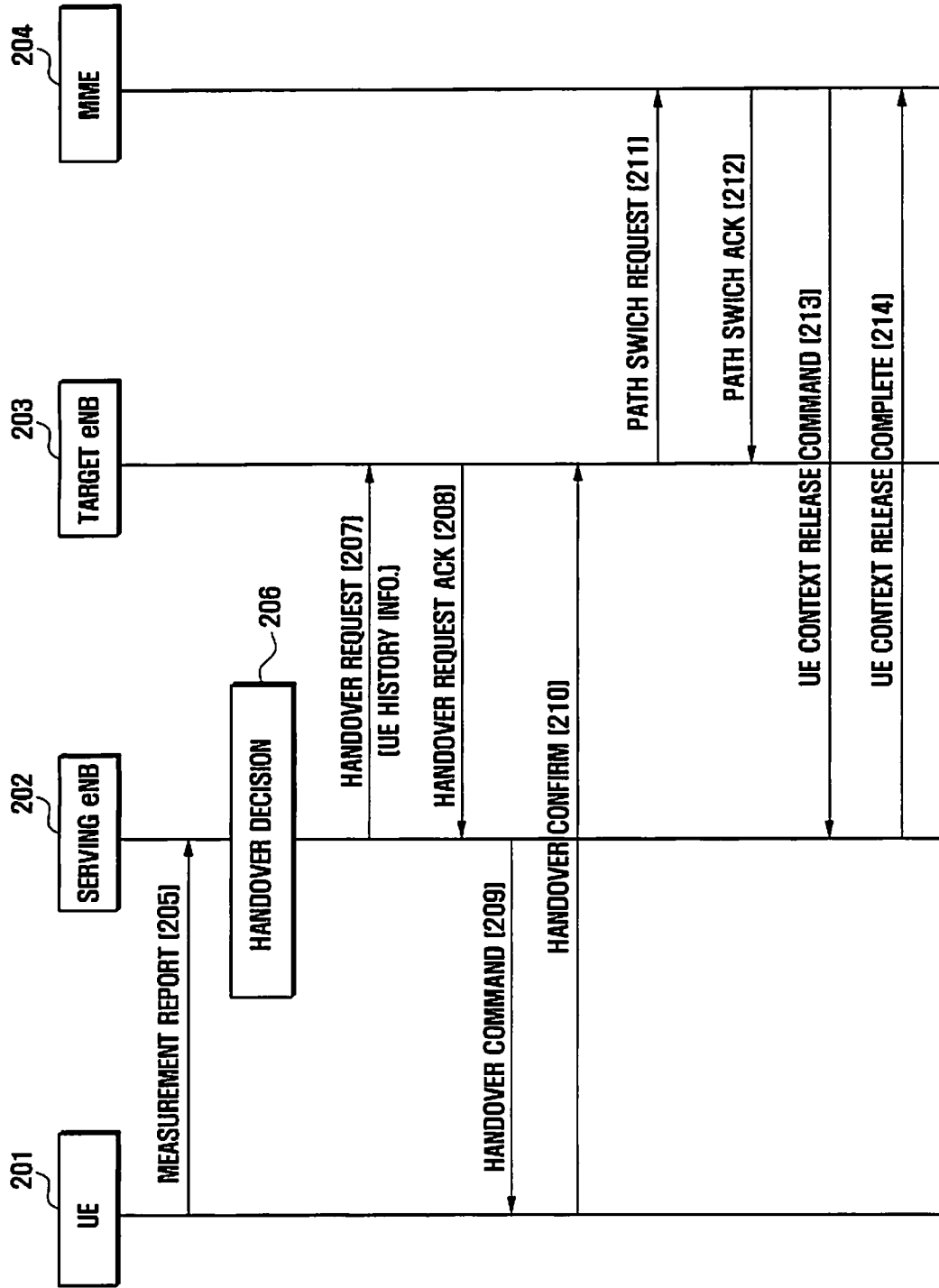
FIG. 2 is a sequence diagram illustrating a method for transmitting UE history information from a source base station to a target base station at the time of a handover between macro base stations according to an exemplary embodiment of the present invention.

FIG. 2 is a sequence diagram illustrating a method for transmitting UE history information from a source base station to a target base station at the time of a handover between macro base stations according to an embodiment of the present invention.

Referring to FIG. 2, a User Equipment (UE) 201 detects a signal of a target base station (eNB) 203, and transmits a measurement report to a serving base station (eNB) 202 in step 205. Next, the serving base station 202 analyzes the received measurement report, checks which base station is a target base station of the UE 201, and decides a handover of the UE based on a Tracking Area ID (TAI) and a used frequency band of the target base station 203 in step 206. The serving base station 202 transfers a handover request message and UE history information to the target base station 202 in step 207. The target base station 203 transmits a response indicating a handover request ACK to the serving base station 202 in step 208. Then, the serving base station 202 instructs the UE 201 to perform a handover to the target base station 203 in step 209.

Subsequently, the UE 201 performs a handover to the target base station 203 in step 210. The target base station 203 informs in step 211 an MME 204 that the handover of the UE 201 is performed. The MME 204 transmits a response signal (e.g. Path switch ACK) to the target base station 203 in step 212, and instructs the service base station 202 to erase all UE information in step 213. The serving base station 202 informs the success of reception of the UE information and the resources used by the UE 201 to the MME 204 in step 214.

The UE history information in step 207 contains cell ID, cell type (large, small, etc.), a served time from a corresponding base station, and information on a plurality of base stations with recent information of a serving base station. The UE, history information is used to prevent a ping-pong handover of a UE from a target cell, namely, a continuous handover of the UE between two base stations within a short time, and for a radio resource allocation algorithm to the UE after estimation of a moving speed of the UE.

The following is an explanation of a method for using history information of a UE operating in an idle mode according to an embodiment of the present invention. Herein, the idle mode is a state in which a Radio Resource Control (RRC) connection established between a UE and a base station is released. Meanwhile, an active mode means a state in which RRC connection between a UE and a base station is established.

FIG. 3 is a diagram illustrating history information recorded by a UE operating in an idle mode according to an embodiment of the present invention.

Referring to FIG. 3, when a recording event occurs in an idle mode, a UE directly records information about the occurred recording event in idle mode UE history information. Upon conversion to an active mode, namely, upon setting the RRC connection between the UE and a base station, the UE transmits the recorded UE history information to the connected base station.

In particular, as shown in FIG. 3, the UE operating in the idle mode manages the UE history information in a form of a table. The UE history information contains at least one of an occurrence event, an ID and related information thereof selected by the user equipment, Public Land Mobile Network (PLMN) information selected by the UE, a time influenced by each event, a time occupying a corresponding cell, and measuring information in the idle mode UE history information. Although not shown, besides the items listed, measurement information items with a cell signal strength may be included in the table of FIG. 3. Here, the cell signal strength may include a self-cell signal strength, a neighbor cell signal strength, or a signal strength of currently camped frequency or different band frequencies. As described above, it should be considered that respective items are listed in the table shown in FIG. 3 by way of example only. The respective items can be removed as needed. In another case, different items can be included in history information recorded in a UE operating in an idle mode.

Figure 4:
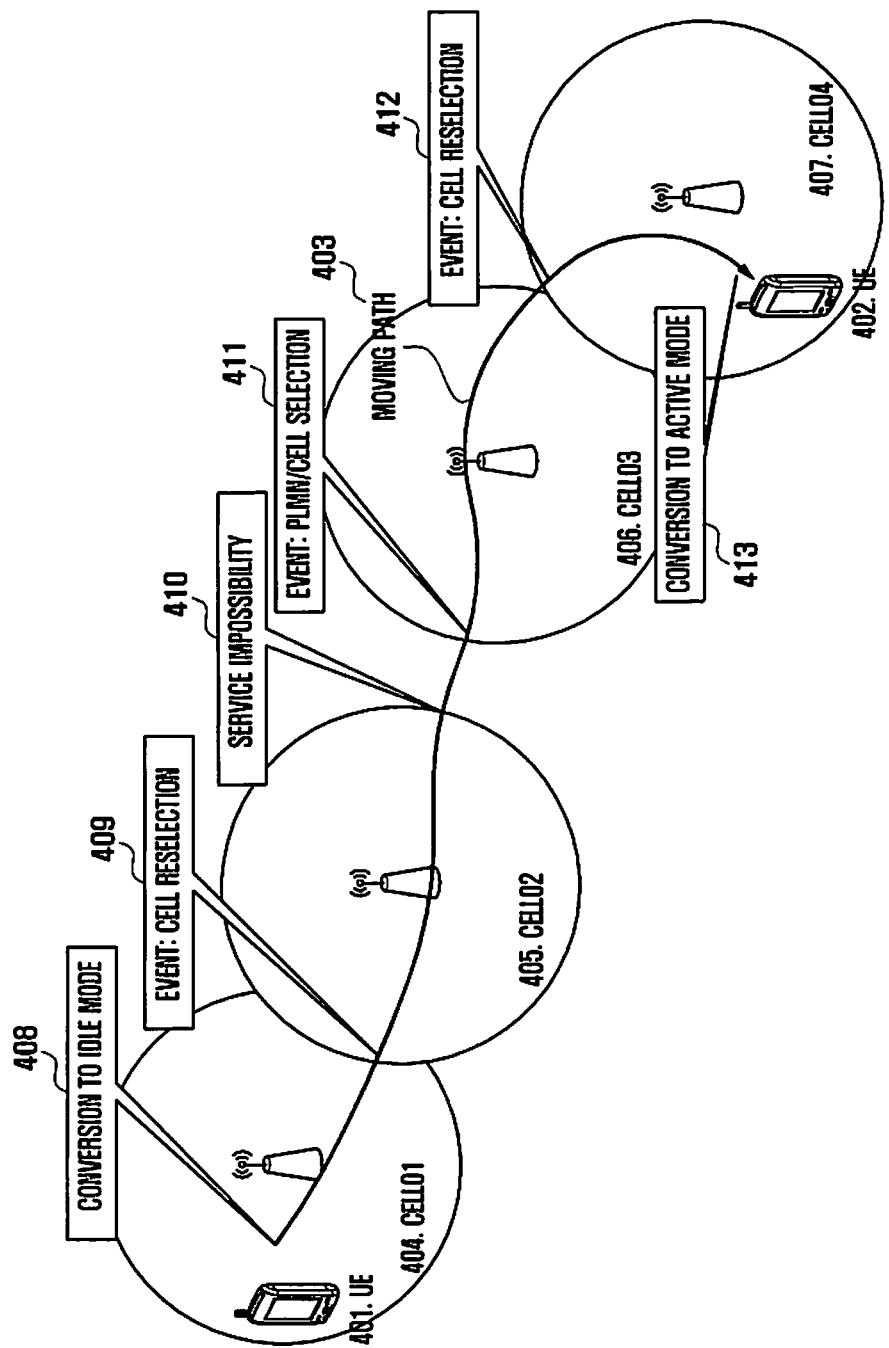
FIG. 4 is a diagram illustrating a procedure of recording UE history information by a UE operating in an idle mode according to an embodiment of the present invention.

FIG. 4 is a diagram illustrating a procedure of recording UE history information by a UE operating in an idle mode according to an embodiment of the present invention.

Referring to FIG. 4, a UE 401 operating in an active mode converts to an idle mode in a first cell 404, moves to cell 04 407 in an idle mode, and again operates in the active mode in a fourth cell 407.

In detail, when an event 408 converting to an idle mode occurs in the first cell 404, the UE 401 records information regarding the occurred event 408 in idle mode UE history information. More particularly, an event with a change of a serving cell occurs in the UE, and the UE records a time stayed in a previous serving cell, namely, the first cell 404, and information about a second cell 405 being a current serving cell in the idle mode UE history information.

Next, when the UE enters into an impossible service zone (i.e. an area where no service is available) and a service impossibility event 410 occurs, the UE records a time stayed in a second cell 405 being a previous serving cell and current service impossibility information in the idle mode UE history information. When the UE enters into a third cell 406, it executes an event selecting a PLMN and a cell, and records the occurrence time of the service impossibility event and information about a current PLMN and service cell in the idle mode UE history information.

When the UE continuously moves and an event in which a serving cell changes from the third cell 460 to the fourth cell 407 occurs, the UE records a time stayed in the third cell 360 being a previous serving cell and information about the fourth cell 407 being a current serving cell in the idle mode UE history information.

When the UE accesses the fourth cell 407 and a conversion event from an idle mode to an active mode occurs, the UE records a time of the fourth cell 407 being a current serving cell operating in the idle mode in the idle mode UE history information. The idle mode UE history information recorded according to an embodiment of FIG. 4 is as shown in FIG. 3.

Figure 5:
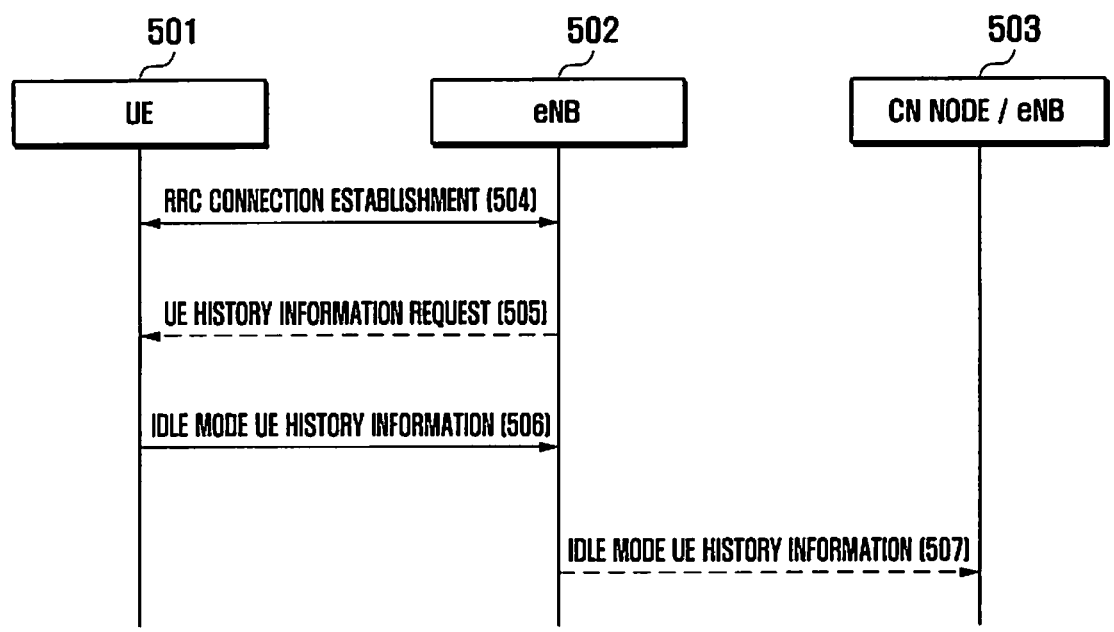
FIG. 5 is a sequence diagram illustrating a procedure of transmitting idle mode UE history information to a base station by a UE in an idle mode according to an embodiment of the present invention.

FIG. 5 is a sequence diagram illustrating a procedure of transmitting idle mode UE history information to a base station by a UE in an idle mode according to an embodiment of the present invention.

Referring to FIG. 5, after a connection between a UE 501 in an idle mode and an RRC is established, i.e. when the UE 501 is converted to an active mode, in step 504, the UE 501 transmits idle mode UE history information to a base station 503 in step 506. In this case, step 506 can be performed by a request from the base station 502 in step 505 or independently while omitting step 505.

Further, step 506 can be performed after step 504 or as a part of step 504. The base station 502 which received the idle mode UE history information may share the idle mode UE history information or information related thereto with another core network entity, i.e., a core network entity such an O & M server or an MME in step 507. Meanwhile, the base station 503 may share the idle mode UE history information or information related thereto with another base station neighboring therewith. Another base station or another core network entity may estimate a moving speed of a UE and then use the idle mode UE history information in a radio resource allocation algorithm, in acquisition of information about its neighbor cells, PCI selection algorithm, problem discovery at the time of an enterpriser's cell planning or setting a cell parameter, a coverage problem discovery of an enterpriser cellular network, and automatic setting of other networks.

Figure 6:
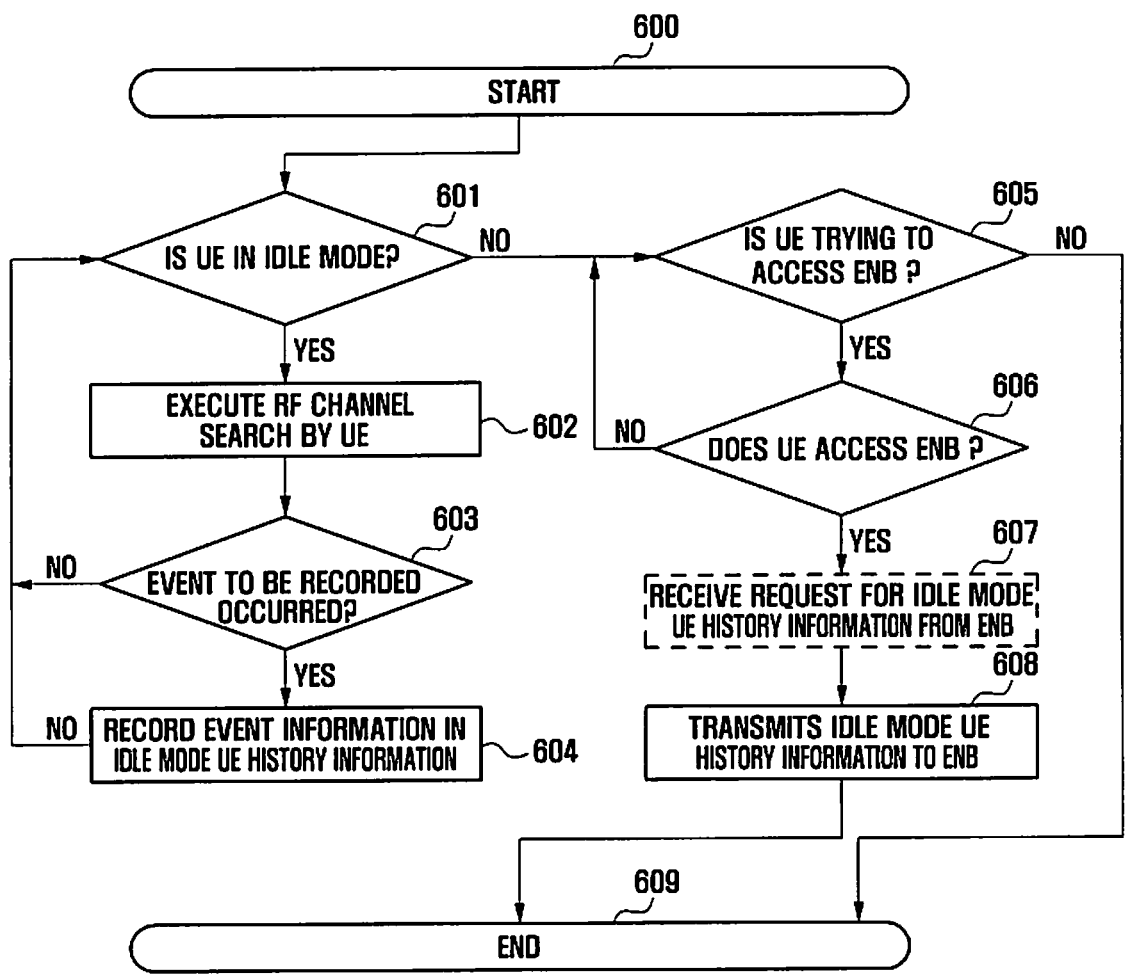
FIG. 6 is a flow chart illustrating an operation of a UE according to an embodiment of the present invention.

FIG. 6 is a flow chart illustrating an operation of a UE according to an embodiment of the present invention.

Referring to FIG. 6, a UE determines if it is in an idle mode in step 601. When the UE is in the idle mode, the UE executes Radio Frequency (RF) channel search in step 602. The UE determines if an idle mode event to be recorded occurs in step 603. When the idle mode event to be recorded occurs, the UE further records relation event information in the idle mode UE history information in step 604.

When the UE is not in an idle mode at step 601, the UE determines if it is attempting to access a base station in step 605. When the UE is attempting to access a base station, the UE determines if it succeeds in accessing the base station to be converted to an active mode in step 606. When the UE is converted to the active mode, the UE receives a request for the idle mode UE history information from the base station in step 607 and transmits the idle mode UE history information to the base station in step 608. In this case, step 608 may be performed according to the request for the idle mode UE history information from the base station 520 in step 607 or be performed independently while omitting step 607.

Figure 7:
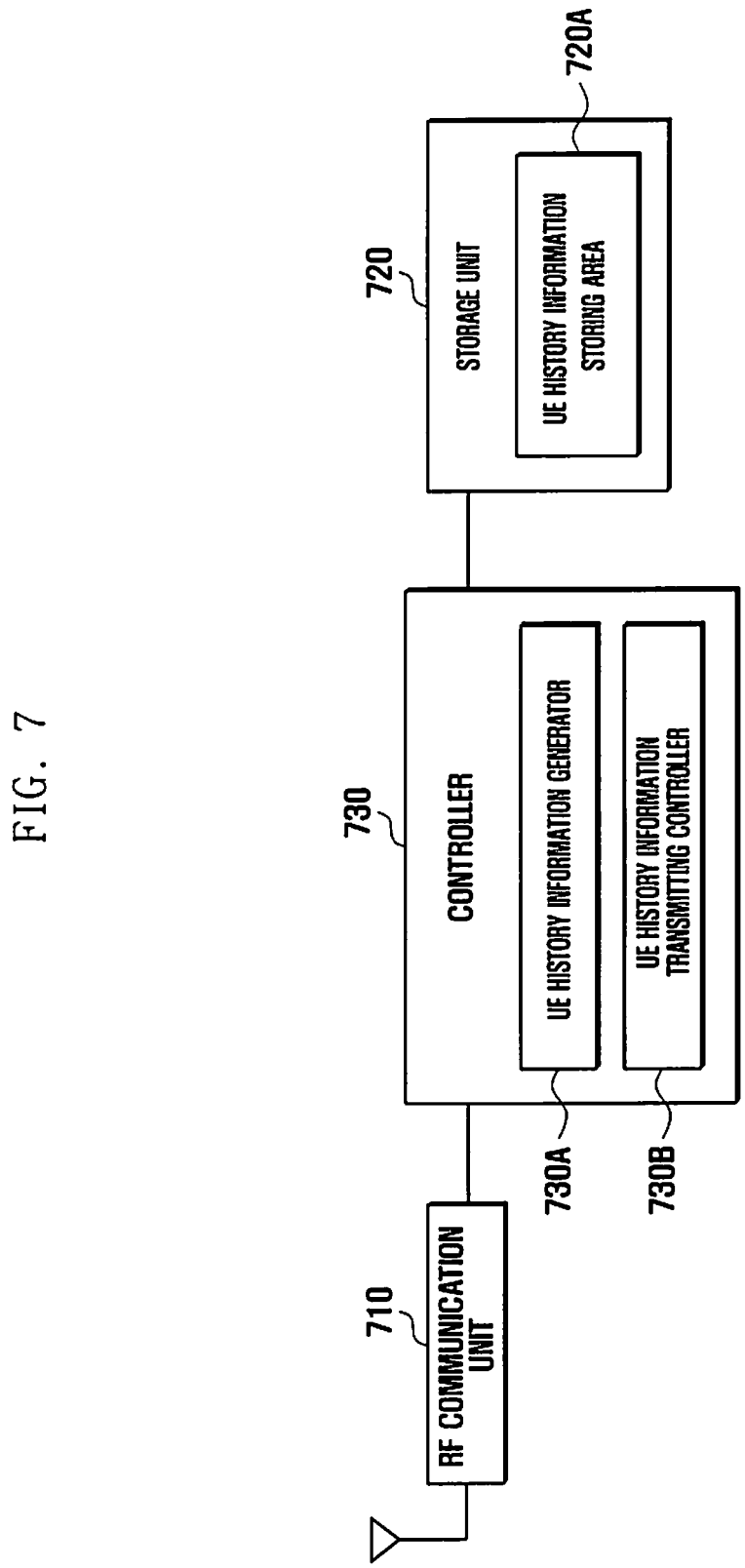
FIG. 7 is a block diagram illustrating an internal configuration of a UE according to an embodiment of the present invention.

FIG. 7 is a block diagram illustrating an internal configuration of a UE according to an embodiment of the present invention. Referring to FIG. 7, the UE according to an embodiment of the present invention includes an RF communication unit 710, a storage unit 720, and a controller 730. The storage unit 720 may include a UE history information storing area 720A. The controller 730 may include a UE history information generator 730A and a UE history information transmitting controller 730B.

The RF communication unit 710 performs transmitting and receiving functions of corresponding data for a wireless communication of the UE. The RF communication unit 710 may be composed of an RF transmitter that up-converts a frequency of a signal to be transmitted and amplifies the signal, and an RF receiver that low-noise amplifies a received signal and down-converts a frequency of the amplified signal. The RF communication unit 710 may receive data through a wireless channel, output the received data to the controller 730, and transmit data output from the controller 730 through the wireless channel. In particular, the RF communication unit 710 according to an embodiment of the present invention may transmit the idle mode UE history information generated from the UE in an idle mode to a base station.

The storage unit 720 stores programs and data necessary for the overall operation of the UE according to an embodiment of the present invention, and may include a UE history information storing area 720A. The UE history information storing area 720A stores idle mode UE history information generated in the UE in an idle mode.

The controller 730 controls signal transmission between respective blocks of another UE according to an embodiment of the present invention. In particular, the controller 730 controls a series of procedures for transmitting the idle mode UE history information according to an embodiment of the present invention. To do this, the controller 730 may include a UE history information generator 730A and the UE history information transmitting controller 730B.

The UE history information generator 730A determines if a UE is in an idle mode. When the UE is in the idle mode, the UE history information generator 730A performs RF channel search to determine if a recording event to be recorded in UE history information occurs. Referring to FIG. 4, the recording event may include at least one of an idle mode conversion event, a cell change event, an impossible service event, a cell re-selection event, and a cell change event.

When the recording event occurs, the UE history information generator 730A records relation information in the idle mode UE history information. As described above, the idle mode UE history information contains at least one of an occurrence event, an ID and related information thereof selected by the UE, Public Land Mobile Network (PLMN) information selected by the UE, a time influenced by each event, a time camped in a corresponding cell, a cell signal strength, and measuring information. The UE history information transmitting controller 730B controls the generated idle mode UE history information to be stored in the UE history information storing area 720B.

The UE history information transmitting controller 730B determines if a UE operating in an idle mode succeeds accessing a base station to be converted into an active mode. When being converted to the active mode from the idle mode, the UE history information transmitting controller 730B controls the idle mode UE history information to be transmitted to the base station. In this case, the idle mode UE history information can be transmitted simultaneously with the accessing of the base station or according to a request from the base station.

In the method for managing UE history information according to the present invention, a UE may transmit its UE history information to a serving base station, and the serving base station may provide an efficient data transmission environment to the UE base on the UE history information.

Although exemplary embodiments of the present invention have been described in detail hereinabove, it should be clearly understood that many variations and modifications of the basic inventive concepts herein taught which may appear to those skilled in the present t will still fall within the spirit and scope of the present invention, as defined in the appended claims.

What is claimed is:

1. A method performed by a terminal in a communication system, the method comprising:
    obtaining mobility history information upon change of a first cell in a radio resource control (RRC) idle state to a second cell, wherein the mobility history information includes an identifier of the first cell and information on a time duration for which the terminal has stayed in the first cell;
    receiving, from a base station, a request for the mobility history information; and
    transmitting, to the base station, the mobility history information, as a response to the request.

2. The method of claim 1, wherein the mobility history information is obtained upon entering in an RRC connected mode or an RRC idle state.

3. The method of claim 1, wherein the request for the mobility history information is received in an RRC connected mode.

4. The method of claim 1, wherein at least one of the first cell or the second cell is an evolved universal mobile telecommunications system radio access network (E-UTRAN) cell, and
    wherein the E-UTRAN cell includes a long term evolution (LTE) cell.

5. The method of claim 1, wherein obtaining the mobility history information comprises obtaining the mobility history information based on an event occurring.

6. The method of claim 5, wherein the event includes time related information.

7. The method of claim 1, wherein the mobility history information includes a cell signal strength.

8. A terminal in a communication system, the terminal comprising:
    a transceiver; and
    a controller coupled with the transceiver and configured to:
        obtain mobility history information upon change of a first cell in a radio resource control (RRC) idle state to a second cell, wherein the mobility history information includes an identifier of the first cell and information on a time duration for which the terminal has stayed in the first cell,
        receive, from a base station, a request for the mobility history information, and
        transmit, to the base station, the mobility history information as a response to the request.

9. The terminal of claim 8, wherein the mobility history information is obtained upon entering in an RRC connected mode or an RRC idle state.

10. The terminal of claim 8, wherein the request for the mobility history information is received in an RRC connected mode.

11. The terminal of claim 8, wherein at least one of the first cell or the second cell is an evolved universal mobile telecommunications system radio access network (E-UTRAN) cell, and
    wherein the E-UTRAN cell includes a long term evolution (LTE) cell.

12. The terminal of claim 8, wherein the controller is further configured to transmit the mobility history information based on an event occurring.

13. The terminal of claim 12, wherein the event includes time related information.

14. The terminal of claim 8, wherein the mobility history information includes a cell signal strength.

* * * * *